United States Patent [19]

Momyer et al.

[11] 4,269,907
[45] May 26, 1981

[54] ELECTROCHEMICAL CELL

[75] Inventors: William R. Momyer, Palo Alto; Ernest L. Littauer, Los Altos Hills, both of Calif.

[73] Assignee: Lockheed Missiles & Space Company, Inc., Sunnyvale, Calif.

[21] Appl. No.: 146,498

[22] Filed: May 5, 1980

[51] Int. Cl.³ .............................................. H01M 2/38
[52] U.S. Cl. ........................................ 429/67; 429/72; 429/149; 429/210
[58] Field of Search ....................... 429/66–70, 429/72, 81, 149, 210

[56] References Cited

U.S. PATENT DOCUMENTS

| 3,730,776 | 5/1973 | Geisler, Jr. | 429/69 X |
| 3,791,871 | 2/1974 | Rowley | 429/122 X |
| 4,007,057 | 2/1977 | Littauer | 429/57 |
| 4,053,685 | 10/1977 | Rowley et al. | 429/68 |
| 4,057,675 | 11/1977 | Halbersdadt | 429/66 X |
| 4,188,462 | 2/1980 | Klootvyk | 429/68 |

Primary Examiner—Charles F. LeFevour
Attorney, Agent, or Firm—Richard H. Bryer

[57] ABSTRACT

An electrochemical cell is shown wherein anode 1 of a reactive metal having an insulating film 2 thereon is separated from cathode 6 by a non-conductive flow screen 4. A porous, expandable element 5 is positioned between screen 4 and cathode 6 to maintain essentially uniform dimensions of the electrolyte flow channel defined by screen 4 as the anode is consumed during cell operation. Preferably, when a multiplicity of cells are electrically connected together, a plurality of separator elements 8 between the respective anodes and cathodes are utilized to ensure that each cell in the multi-cell configuration is subject to essentially identical compression forces in assembly and during discharge.

8 Claims, 4 Drawing Figures

ELECTROCHEMICAL CELL

The invention described herein was made in the course of or under Contract No. 1400140-78-C-6435 with the United States Department of Navy.

TECHNICAL FIELD

This invention relates to an electrochemical cell for producing electrical energy from the reaction of alkali metals with water.

BACKGROUND ART

This application describes and claims certain improvements in the basic electrochemical cell disclosed in U.S. Pat. No. 3,791,871. The basic mechanism of operation of the cell described in the aforementioned patent is incorporated by reference in this application. Briefly, the cell utilizes an alkali metal anode highly reactive with water spaced from a cathode by an electrically insulating film which forms naturally on the anode in the presence of water. This thin film permits the cathode to be placed in direct contact with the anode. The anode and cathode are immersed in an aqueous electrolyte. In U.S. Pat. No. 4,057,675 the cathode is in the configuration of a metal screen and the electrochemical reaction which occurs at the cathode in aqueous solution is the evolution of hydrogen.

DISCLOSURE OF INVENTION

Briefly, in accordance with the invention, there is described a configuration which permits the use of active solid cathode materials which are considered advantageous in many applications. Such cathode materials are exemplified but not limited to silver oxide and silver peroxide which have heretofore been utilized in such batteries as the silver oxide-zinc battery and the silver oxide-aluminum battery (described in U.S. Pat. No. 3,953,239).

A typical advantage of using a solid active cathode with a reactive metal such as lithium is the fact that the couple provides high voltage and all active ingredients are dry materials which facilitates long-term storage. When the system is to be activated, only water needs to be admitted. A bipolar battery made in this fashion can be stored for many years in, for example, a torpedo. On launching, seawater is admitted, combines with the lithium and a suitable salt to produce the required electrolyte and the high energy available from the couple is immediately realized. Additionally, the electrochemical reaction at the cathode does not involve the evolution of hydrogen.

While the use of a cathode screen is not desirable in applicants' cell, applicants have discovered that the screens serve an unexpected advantageous purpose. In addition to providing a path between the anode and cathode for passage of the electrolyte, the screen also causes the electrolyte within the cell to swirl and mix which facilitates the transport of ions within pores of the insulating film coating the anode. It has been determined that this transport is highly desirable in the operation of the cell.

In contradistinction to the screen configuration of the aforementioned patents, applicants utilize a nonconducting flow screen, not an active cathode screen, to separate the anode and solid cathode of their cell. Since the flow screen is nonconducting, it does not draw off any of the electrochemical reaction from the solid cathode. The flow screen serves the additional advantageous function of preventing any accidental shorting of the cell that might occur should the insulating film on the anode break down in whole or in part.

It has been further discovered that the maintenance of optimal cell performance is achievable by ensuring that the flow screen is pushed at all times against the insulating film on the anode surface as the active anode material is consumed, thereby ensuring that the electrolyte flow channel defined by the screen does not change in dimensions during anode consumption. The cathode, however, remains fixed and does not move in concert with the screen.

To ensure that the flow channel does not change in dimension during cell operation, it has been discovered in contra-distinction to what would be expected by one skilled in the art, that a porous expandable element can be placed directly adjacent the active cathode surface, without impairing its electrochemical activity. This element is of such a thickness and porosity that it can be compressed and yet allow the electrolyte to pass through it freely. As the anode is consumed during operation, the porous element expands from its initial compressed state against the flow screen which is positioned against and between the insulating film and the porous element, thereby maintaining the flow screen in position against the insulating film at all times during cell operation. Thus, although the relative distance of the cathode from the anode increases as the anode is consumed, the dimensions of the flow channel and its desirable hydrodynamic feature do not change.

When considering a bipolar cell stack containing many cells, such as for example in a torpedo battery, engineering problems are encountered in maintaining all cells uniformly compressed as the anode is consumed. If a pressuring system such as a spring or hydraulic mechanism is placed at one end, the distribution of force among all the cells in the stack will not be uniform. This is particularly the case when efforts are made to ensure that all cells fit snugly in the battery case. A close fit is needed to ensure uniform distribution of electrolyte between all cells and to prevent leakage of electrical currents to and from cells at different voltages in the stack.

Preferably, therefore, in the multicell configuration of the invention, means are provided to ensure that the multiplicity of cells will have identical internal spacing between the respective anodes and cathodes by being subjected to identical compression forces in assembly and during discharge. Such means can naturally be utilized in the unipolar cells of the invention although the beneficial result is not so apparent.

This is accomplished by inserting in the anode nonconductive separators such as spheres of suitable dimension such that when one side of the sphere is situated against the anode support, the body of the sphere will project beyond the thickness of the anode, will pass through the opening in the flow screen and will push through the porous expandable element and touch the surface of the solid cathode. In this manner, by utilizing identical spheres or protrusions or the like, a multiplicity of identical cells can be assembled in a multicell battery, typically of bipolar configuration. A compressive force is applied to an end electrode, for example when mounted in the insulating casing, and all cells will compress to an identical amount defined by the embedded spheres in the anode. On discharge, such a multicell battery will maintain identical internal spacing for each cell therein as the anode is consumed.

BRIEF DESCRIPTION OF DRAWINGS

The various features and advantages of the invention will become apparent upon consideration of the following description taken in conjunction with the accompanying drawing of the preferred embodiments of the invention. The views of the drawing are as follows.

Best Mode of Carrying Out the Invention

Figure 1:
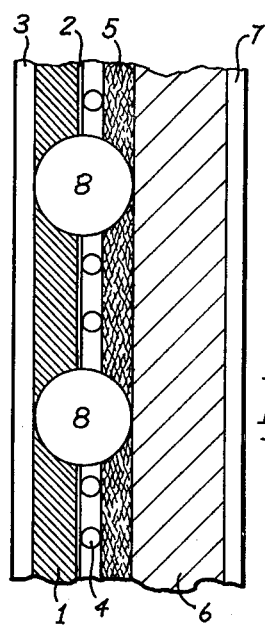
FIG. 1 is a side cross-sectional view of a unipolar cell of the invention fully compressed prior to being discharged.
Figure 1A:
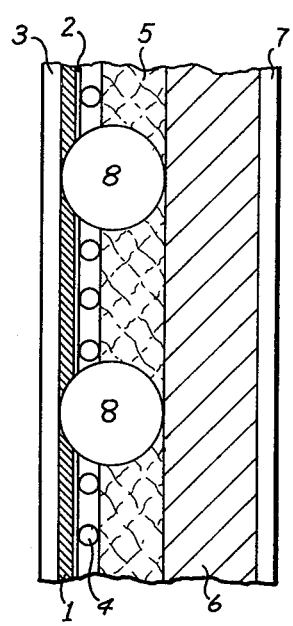
FIG. 1A is a side cross-sectional view of the unipolar cell of FIG. 1 showing the cell as it nears almost total discharge.

With reference to FIGS. 1 and 1A, where like reference characters designate corresponding parts throughout the several views, there is depicted a unipolar cell of the invention which in FIG. 1 is mounted in a compressed condition in an insulating case, not shown, and in FIG. 1A is near total discharge.

Anode 1 with insulating film 2 thereon is bonded to anode backplate 3. Flow screen 4 is positioned against and between the film 2 and self-expanding compression foam 5. Foam 5 is positioned between screen 4 and solid cathode 6 which is bonded to cathode backplate 7. These figures also depict the optional use of separator elements 8 in the form of identical spheres constrained between anode backplate 3 and the surface of cathode 6. Provision, not shown, is made for encasing the electrodes in an insulating container, providing ingress and egress chambers for the distribution of the electrolyte and providing connectors for making electrical contact with the anode and cathode backplates.

Comparing FIGS. 1 and 1A, as anode 1 is consumed during operation, flow screen 4 is pushed at all times against insulating film 2 by the expansion of foam 5. Accordingly, the electrolyte flow channel defined by screen 4 does not change in dimension during anode consumption. Spheres 8 remain constrained between backplate 3 and cathode 6 during operation of the cell.

Figure 2:
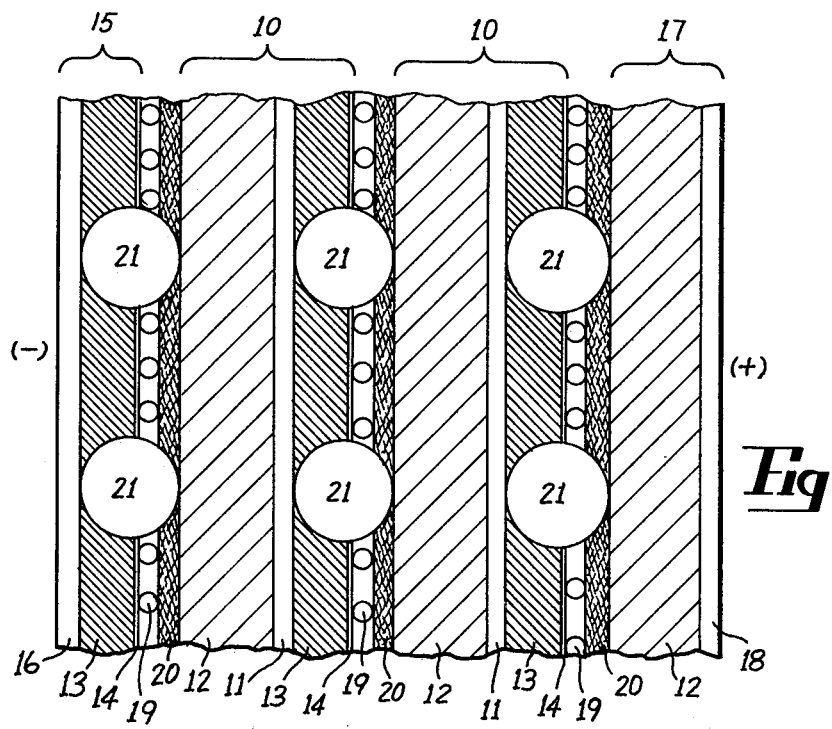
FIG. 2 is a side cross-sectional view of a multiplicity of cells of the invention in bipolar configuration fully compressed prior to being discharged.

With reference to FIG. 2, where like reference characters designate corresponding parts, there is depicted a multiplicity of cells of the invention in a bipolar configuration. These cells are in a compressed state in an insulating case not shown.

Bipolar electrodes 10 comprise an intercell electrical connector 11 which is bonded on one side to solid cathode 12 and on the other side to anode 13 with insulating film 14 thereon. The end unipolar electrode 15 consists of anode 13 having insulating film 14 thereon bonded to anode backplate 16. End unipolar electrode 17 consists of solid cathode 12 which is bonded to cathode backplate 18. Flow screen 19 is positioned against and between insulating film 14 and self-expanding compression foam 20. Foam 20 is positioned between screen 19 and solid cathode 12. Separator element 21, in the form of identical spheres, is constrained between anode backplate 16 or intercell connector 11 and the surface of cathode 12. Provision, not shown, is made for encasing the cells in an insulating container, providing ingress and egress chambers for the distribution of the electrolyte and providing electrical connection to the anode and cathode backplates. During operation, as the anode is consumed, the flow screen 19 is pushed at all times against the insulating film 14 by the expansion of foam element 20. Spheres 21 ensure that each cell in the multicell configuration is subject to identical compression forces in assembly and during discharge.

Figure 3:
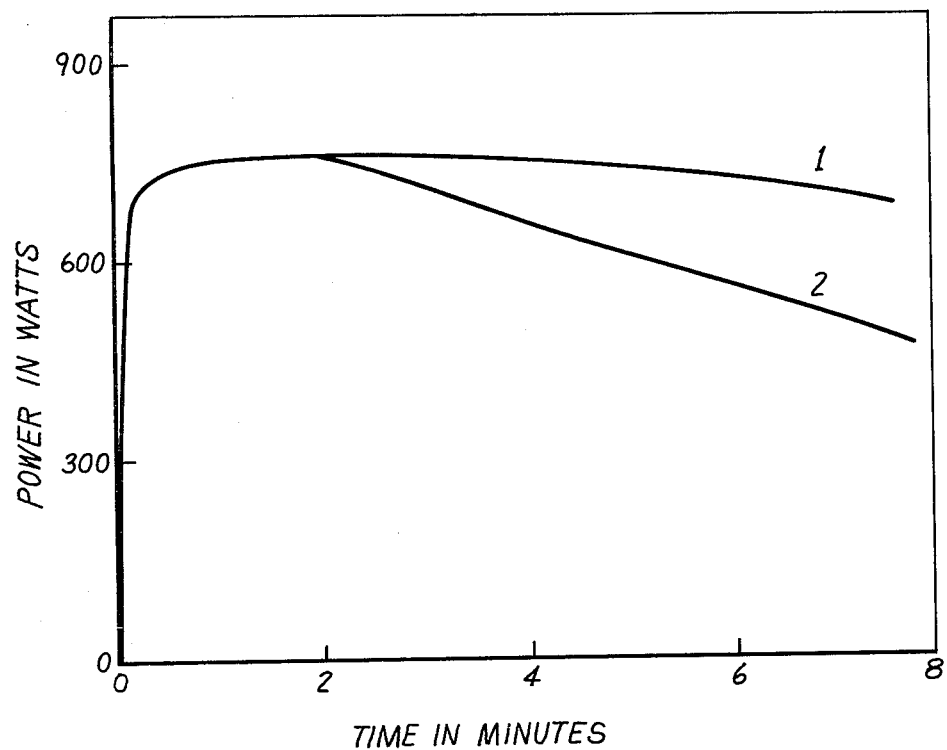
FIG. 3, on coordinates of power in watts and time in minutes, is a plot showing the importance of providing continuous contact between the flow screen of the invention and the anode during discharge of a cell of the invention.

FIG. 3 illustrates the importance of providing continuous contact between the flow screen of the invention and the anode surface during discharge of a cell of the invention.

A cell was constructed comprising a lithium anode of 50 inch$^2$ area containing 20 glass beads, a 0.025 inch thick Vexar flow screen, one-sixteenth inch thick 10 pores per inch reticulated polyurethane foam and a silver oxide cathode. Lithium hydroxide solution 4.4 molar at 45° C. was flowed through the cell at a rate of 0.8 gallons per minute. The cell was discharged through a constant load for a period of eight minutes and the discharge curve 1 is plotted in FIG. 3. Current and voltage were measured on digital equipment and multiplied to provide the power of the cell. As shown by curve 1, for the full duration of the run, virtually constant power was obtained even though the internal spacing between the anode and cathode increased due to anode consumption.

The cell of curve 1 was then reassembled but the foam element was removed therefrom. Curve 2 shows the discharge power performance. As shown, both curves 1 and 2 show identical initial power, thus confirming the unexpected discovery that a foam of optimal configuration will not obstruct the reaction process at the cathode and will not introduce $I^2R$ losses into the cell.

However, after about two minutes of discharge, the power of the cell depicted by curve 2 began to decrease significantly. This is due to the fact that without the foam element of the invention, as the lithium anode is consumed, the small increase in gap so generated permits the flow screen to move away from and not maintain intimate contact with the insulating film on the anode. This freedom of movement of the flow screen is clearly highly detrimental to the performance of the cell.

While the electrolyte utilized in the cell of FIG. 3 was an aqueous alkali metal hydroxide, any one of a number of other aqueous solutions should be equally feasible provided such aqueous electrolytes have the requisite film forming characteristics. See, for example, the discussion in U.S. Pat. No. 4,007,057.

The anodes of the cells of the invention are formed of an alkali metal such as sodium, lithium and potassium which are highly reactive with water and in the presence of water naturally forms on its surface a protective insulating film. Alloys and compounds of the alkali metals and other reactive metals should be equally feasible for use as the anode provided they are substantially as reactive with water as are the above mentioned alkali metals, and further provided in common with such metals they naturally form a continuous insulating film in the presence of water. Molarity of the electrolyte is varied as discussed in U.S. Pat. No. 3,791,871 to control power output of the cells. The thickness of the anode is dependent upon the composition of the material used and the electrical capacity desired.

Typical cathodic materials are exemplified but not limited to silver oxide and silver peroxide. Other materials include manganese dioxide and nickel oxide. The thickness of the cathode material, like the anode, is dependent upon the composition of the material used and the electrical capacity desired. When the reactive cathode material is contained within the electrolyte, for example hydrogen peroxide and other additives described in U.S. Pat. No. 4,007,057, the cathode element may comprise a simple sheet of catalytic material.

The material selected as the porous, expandable element must be capable of being compressed without the holes within it being closed or obstructed when in the compressed state. It should be capable of expanding again as the anode is consumed and thus must retain its elasticity for long periods of time when stored under compression. The material should be inert to reactive metals and oxidizing cathode reactants such as silver oxide, hydrogen peroxide and the like and it should be unaffected by alkaline solutions. Exemplary materials are certain grades of rubber, latex and polyurethane in the form of reticulated foam. Another type of foam material which is acceptable is that which swells and expands when contacted by aqueous solutions. This feature obviates the requirement to maintain elasticity when stored for long periods. Typical of such materials are cellulosic type polymers such as the alkali salts of carboxy methyl cellulose, and the alkali salts of polyglucuronic acids and methyl cellulose.

The open mesh flow screen of the invention is of any suitable non-conducting material such as Vexar plastic, polyethylene, polypropylene, teflon and the like or it may be a metallic screen suitably insulated with a plastic or paint coating.

The size of the screen openings, the thickness of the screen, the dimensions of the separator elements, the thickness of the expandable element and the porosity of the element are interdependent variables which can be routinely determined by one skilled in the art in view of the teachings herein.

The minimum size of the screen opening is defined by the need to get electrolyte to the anode and cathode plus the need to remove products of reaction away from the electrodes. The minimum size of the openings is also defined by the desired hydrodynamic features of the flow channel of the cell which is readily obtained by routine experimentation.

In those embodiments of the invention where spheres are used as separator elements, the minimum size of the openings is also defined by the dimensions of spheres. The sphere dimensions are, in part, determined by the thickness of the anode in which the spheres are embedded. The dimensions of the spheres are also dependent on the thickness of the compressed porous element and the screen thickness.

The thickness of the compressed porous element is determined by the individual compressive features of the material selected and the amount of expansion which is desired, which is dependent upon the thickness of anode material consumed. The porosity of the expandable element has to be such that even when under compression electrolyte flow to and from the cathode is not significantly impaired with a resulting power loss.

The maximum size of the flow screen openings is determined again by the desired hydrodynamic features of the flow channel of the cell.

The thickness of the screen which defines the electrolyte flow channel can be determined by routine experimentation. The minimum thickness, in conjunction with the minimum screen size openings determines the requisite backpressure required to obtain the desired electrolyte flow rate past the electrodes.

Excessive pressures are wasteful of energy and can cause the electrodes to be forced apart, thus potentially separating the screen element from the insulating film with a reduction in cell output and an increase in $I^2R$ loss.

The requisite flow rate is determined by the need to achieve the desired swirling and mixing of the electrolyte to facilitate ion transport across the film and to remove heat from within the reacting cells.

Maximum screen thicknesses are determined by the acceptable $I^2R$ loss that can be tolerated for a particular application, with increasing thickness increasing the $I^2R$ loss. Maximum thicknesses are also determined by the desired hydrodynamic features of the flow channel. Also, with increasing thickness, the flow channel increases thereby increasing the volume of electrolyte to be pumped, with a resulting increase in the pumping demands of the cell.

It has been determined that for many applications the screen thickness lies within the range of 0.015 to 0.04 inches.

Typical of the steps taken to arrive at the dimensions of the various elements of the cell are given in the following example.

If a cell is to be discharged at a rate of 6 A/in$^2$ for eight minutes and provide 600 A of electricity, an electrode area of 100 in$^2$ will be required. Using Faraday's law of electrolysis and the known density of lithium, it can be calculated that a minimum thickness of 0.024 inches of lithium will be required. The thickness of compressable foam to maintain contact of the flow screen against the anode surface as the anode is depleted was found by tests to be 1/16 inches with 10 pores per inch of foam. Using a greater thickness of foam, for example ⅛ inch, caused all pores to close when compressed. A thinner foam did not have the ability to expand sufficiently when the lithium was consumed. Tests with foams possessing greater than 10 pores per inch resulted in inferior performance because such foams have smaller diameter holes which tend to close when under compressive force.

The diameter of the spheres used to maintain the overall cell dimensions constant is the sum of the lithium thickness, the screen thickness and the compressed thickness of the foam. In this example, glass spheres of 0.06 inch diameter were used and the screen mesh size was 9 mesh or 9 holes per inch. The number of spheres used must be sufficient to provide uniform loading across the entire area of the anode and cathode. For a 100 inch$^2$ electrode, it was found that spheres could be placed on 2 inch centers.

We claim:

1. In a reactive metal anode-aqueous electrolyte electrochemical cell, an alkali metal anode having an electrically insulating film on its surface and a solid cathode spaced from said anode, said cell characterized by a non-conductive flow screen defining an electrolyte flow channel between said anode and cathode and being positioned against said anode insulating film and a porous, expandable element, said element being positioned between and contacting said flow screen and said cathode, thereby maintaining contact between said film and screen as the anode is consumed during operation.

2. An electrochemical cell in accordance with claim 1 wherein a plurality of non-conductive separators are utilized between said anode and said cathode, said separators being embedded in said anode and projecting through said flow screen and porous element to contact said cathode.

3. An electrochemical cell in accordance with claim 1 wherein said alkali metal is lithium.

4. An electrochemical cell in accordance with claim 1 wherein said alkali metal is sodium.

5. An electrochemical cell in accordance with claim 2 connected in a bipolar configuration to at least one other cell in accordance with claim 2.

6. In a reactive metal anode-aqueous electrolyte electrochemical cell stack, a plurality of bipolar cells connected in series, each bipolar cell consisting of an alkali metal anode having an electrically insulating film on its surface and a solid cathode spaced from said anode, said cell characterized by a non-conductive flow screen defining an electrolyte flow channel between said anode and cathode and being positioned against said anode insulating film and a porous, expandable element, said element being positioned between and contacting said flow screen and said cathode thereby maintaining contact between said film and screen as the anode is consumed during operation and a plurality of non-conductive separators between said anode and cathode, said separators being embedded in said anode and projecting through said flow screen and porous element to contact said cathode thereby ensuring that each cell in the cell stack is subject to essentially identical compression forces in assembly and during discharge.

7. An electrochemical cell stack in accordance with claim 6 wherein said alkali metal is lithium.

8. An electrochemical cell stack in accordance with claim 6 wherein said alkali metal is sodium.

* * * * *